(12) United States Patent
Hatanaka et al.

(10) Patent No.: US 7,813,229 B2
(45) Date of Patent: Oct. 12, 2010

(54) GAIN SETTING METHOD FOR OPTICAL DISK REPRODUCING APPARATUS

(75) Inventors: Norio Hatanaka, Kyoto (JP); Ryoichi Nishio, Osaka (JP); Ryoichi Ishikawa, Kyoto (JP); Takayuki Ohta, Kyoto (JP)

(73) Assignee: Panasonic Corporation, Osaka (JP)

( * ) Notice: Subject to any disclaimer, the term of this patent is extended or adjusted under 35 U.S.C. 154(b) by 973 days.

(21) Appl. No.: 11/584,592

(22) Filed: Oct. 23, 2006

(65) Prior Publication Data

US 2007/0091772 A1    Apr. 26, 2007

(30) Foreign Application Priority Data

Oct. 24, 2005    (JP)    ................. 2005-308213

(51) Int. Cl.
    G11B 7/00    (2006.01)
(52) U.S. Cl. .................. 369/44.25; 369/124.15; 369/44.29; 369/44.35
(58) Field of Classification Search .......... None
    See application file for complete search history.

(56) References Cited

FOREIGN PATENT DOCUMENTS

| CN | 1218948 A | 6/1999 |
|----|-----------|--------|
| EP | 0 919 994 A1 | 6/1999 |
| JP | 2000-100059 | 4/2000 |
| WO | WO 2005057575 A1 * | 6/2005 |

OTHER PUBLICATIONS

Chinese Office Action issued in Chinese Patent Application No. CN 200610150726.9 dated May 27, 2010.

* cited by examiner

*Primary Examiner*—Jorge L Ortiz Criado
(74) *Attorney, Agent, or Firm*—McDermott Will & Emery LLP

(57) ABSTRACT

A gain setting method for setting a gain in an amplifier that amplifies signals obtained from an optical disk, which includes: a measuring step for measuring an output level of the amplifier; and a gain setting step for setting the gain as the value of the target level/output level, when the measured output level is in a range of 1/N times and N times (N is an integer of 2 or larger) with respect to the preset target level.

20 Claims, 7 Drawing Sheets

GAIN SETTING METHOD FOR OPTICAL DISK REPRODUCING APPARATUS

BACKGROUND OF THE INVENTION

1. Field of the Invention

The present invention relates to a gain setting method for an optical disk reproducing apparatus such as a compact disk player.

2. Description of the Related Art

Recently, a recording-type CD called a CD-RW that is capable of overwriting has been developed. Furthermore, a low-reflectance disk is also developed for a CD-R that is a recording-type CD incapable of overwriting. In a conventional optical disk reproducing apparatus disclosed in Japanese Published Patent Literature (Japanese Unexamined Patent Publication 2000-100059), a function of switching the gain of an amplifier in two stages, i.e. the gain of one time or four times relatively to the normal gain corresponding to such recording-type CDs, is incorporated. In the conventional optical disk reproducing apparatus, both the CD with high reflectance and the CD (CD-RW and the like) with low reflectance can be reproduced by switching the gain of the amplifier.

FIG. 7 is a flowchart of a conventional disk identifying method. In an example of the conventional gain setting procedure, gain switching processing at the time of identifying the disk, and two-stage gain setting (rough gain setting and precise gain setting) in accordance with the gain switching processing are performed.

First, the gain switching processing performed at the time of identifying the disk is described. A laser is set ON in step 121, and injecting signal is inserted in the tracking direction in step S122 to drive a readout device reciprocally in the tracking direction via a driver. In step 123, the maximum and minimum values of the focus error signal in that state are measured and the maximum value of the amplitude of the focus error signal is obtained from the difference thereof. Then, the measured maximum amplitude of the focus error signal is compared to a threshold value in step 124. When the maximum amplitude is larger than the threshold value, it is shifted to step 125. When the maximum amplitude is smaller than the threshold value, it is shifted to step 126.

In the step 125, the gain is set to keep as it is one-time (×1), the tracking gain is provisionally set also as one-time (×1), and the RF is set as one-time (×1) as well. Then, it is shifted to step 127. In the meantime, in the step 126, the gain is changed to four times (×4), the tracking gain is provisionally set also as four times (×4), and the RF is set as four times (×4) as well. Then, it is shifted to the step 127 where the disk is rotated. In step 128, injecting signal is inserted in the tracking direction to drive the readout device reciprocally in the tracking direction via the driver. In step 129, the maximum and minimum values of the tracking error signal in that state are measured and the maximum value of the amplitude of the tracking error signal is obtained from the difference thereof. Then, the measured maximum amplitude of the tracking error signal is compared to the threshold value in step 130. When the maximum amplitude is larger than the threshold value, it is shifted to step 131. When the maximum amplitude is smaller than the threshold value, it is shifted to step 132.

In the step 131, identification of the disk is ended while the gains set in the steps 121-130 are kept as it is in those conditions. Meanwhile, in the step 132, identification of the disk is ended after changing the gains.

Next, the rough gain setting will be described. The rough gain setting is performed respectively in the focus error and the tracking error. In step 133, the readout device is driven reciprocally in the focus error direction for the focus error and in the tracking error direction for the tracking error, respectively, and the amplitudes of the error signals are measured in step 134. In step 135, the injecting signal amplitude is determined based on the result of the measurements in the step 134, and setting of the rough gain is completed. Determination of the injecting signal amplitude may be set as the amplitude of the injecting signal that may be easily used for the precise gain control, e.g. the value that is ½ times the measured amplitude. Measurement of the amplitude of the error signals is carried out at the time of identifying the disk. However, it is measured again at the time of setting the rough gains, since there are cases where the gains are changed at the time of identifying the disk.

Next, the precise gain setting will be described. First, in step 137, injecting signal is generated based on the gains determined in the rough gain setting described above so as to operate the readout device. The amplitude of the error signals is measured in step 138, and the gains are determined in step 139. Thereby, the setting is completed.

Although there is switching at two-stages in accordance with the reflectance performed in the conventional disk reproducing apparatus and the gain setting method thereof, the gains are fixed at the ratio of the input resistance of the operational amplifier to the feedback resistance thereof. Therefore, the individual dispersions may be generated when mass-production is carried out as products, due to characteristic dispersions in the lasers, light-receiving elements and the like which constitute the readout device, and the characteristic dispersions in the resistances which constitute the operational amplifier. In addition, there also exist individual dispersions in the reflectance of the disks to be reproduced. As a result, dispersions are also generated in the levels of the signals inputted to an A/D converter at a latter stage of the amplifier, which results in generating dispersions in the error signals. However, when there are dispersions in the error signals, the servo accuracy for each of the focus and tracking signals is deteriorated so as to also generate dispersions in the RF signals. Normally, the dispersions in the RF signals generated in this manner are absorbed with an AGC or an equalizer at the latter stage. If the dispersions become so large that they cannot be absorbed, the reproducing capacity of the disk reproducing apparatus becomes deteriorated. Thus, it becomes impossible to perform fine reproduction, including the cases where there is a fingerprint or the like adhered to the surface of the disk.

Furthermore, in the servo LSI and the like of low years, there are such types that the precise gain control is performed on the error signals inputted from the amplifier through carrying out the operational processing by the digital filter after A/D conversion. In such a structure, the readout device is operated actively (this operation is referred to as active operation hereinafter), and the error signal in that state is measured to calculate the gain. However, it is necessary to perform two stages of gain calculating processing, i.e. the gain calculation that is performed in advance for determining the gain of the applying drive signal at the time of the above-described active operation, and the gain calculation performed based on the measurement of the error signal at the time of the active operation. For the control thereof, an extra ROM area is required in the controller.

SUMMARY OF THE INVENTION

The main object of the present invention therefore is to achieve stabilization of the servo operation and reduction of the servo operation ROM area.

In order to overcome the aforementioned issues, the present invention provides a gain setting method for setting a gain in an amplifier that amplifies a signal obtained form an optical disk. The method comprises steps of: a measuring step for measuring an output level of the amplifier; and a gain setting step for setting the gain to a value of the target level/the output level when the measured output level is 1/N–N times (N is an integer of 2 or larger) with respect to a preset target level.

The present invention can be described more specifically as follows. That is, the method comprises steps of: a measuring step for measuring an output level of the amplifier by constituting the amplifier with a first gain setting part for performing gain setting of a multiple of an integer of 2 or larger and gain setting of 1/N times (N is an integer of 2 or larger), and a second gain setting part for performing gain setting of ½-2 times; a comparing step for comparing a measured value that is measured in the measuring step with a preset target level, and outputting a comparison result thereof; and a calculating step for calculating gain setting values of the first gain setting part and the second gain setting part based on the comparison result.

The present invention is preferable to be constituted as stated below. That is, the present invention should be carried out by the gain setting method for setting the gain in the amplifier that comprises: the first gain setting part constituted with an analog gain setting part; the second gain setting part constituted with a digital gain setting part; and an A/D converter that performs A/D conversion to an analog signal whose gain has been set in the first gain setting part, and supplies a converted signal to the second gain setting part.

The present invention is preferable to be constituted as described below. That is, the comparing step outputs the target level/the measured value as a first comparison result. The calculating step further calculates the gain setting value of the first gain setting part, when the first comparison result is smaller than ½ times or larger than 2 times. The comparing step further outputs a comparison between the first comparison result and the gain setting value of the first gain setting part as a second comparison result. The calculating step calculates the gain setting value of the second setting part based on a result of comparison between the second comparison result and the gain setting value of the first gain setting part.

In addition, the present invention is preferable to be constituted as mentioned below. That is, when the measured output level is larger by N times (N is an integer of 2 or larger) or smaller by 1/N times with respect to the target level, the gain setting step sets the gain by multiplying or dividing the first gain value based on a value of the target level/the output level after setting a first gain value.

As well, the present invention is preferable to be constituted as stated below. That is, the calculating step further calculates the gain setting value of the first gain setting part based on the comparison result. The measuring step measures amplitudes of an input signal and an output signal of the amplifier respectively. The comparing step outputs a ratio Vo/Vi between a target value Vo of the output signal in the amplitude to a measured value Vi of the input signal in the amplitude as the comparison result. When the ratio Vo/Vi satisfies $½<=Vo/Vi<=2$, the calculating step sets the gain setting value of the first gain setting part as a preset initial value $G1i$, and sets the gain setting value of the second gain setting part as Vo/Vi. When the ratio Vo/Vi satisfies Vo/Vi>2, the calculating step sets the gain setting value of the first gain setting part as $G1i+N$ (N is a variable starting from 1, increased by 1 in order), the comparing step recalculates the ratio Vo/Vi, and the calculating step executes first processing when the recalculated ratio satisfies Vo/Vi<=2, and executes second processing when the recalculated ratio Vo/Vi satisfies Vo/Vi>2 in order to set the gain setting value of the first gain part and the gain setting value of the second gain part, respectively. When the ratio Vo/Vi satisfies Vo/Vi<½, the calculating step sets the gain setting value of the first gain setting part as $1/(initial\ value\ G1i+N)$ (N is a variable starting from 1, increased by 1 in order), the comparing step recalculates the ratio Vo/Vi, and the calculating step executes third processing when the recalculated ratio satisfies Vo/Vi>=½, and executes fourth processing when the recalculated ratio Vo/Vi satisfies Vo/Vi<½ in order to set the gain setting value of the first gain part and the gain setting value of the second gain part, respectively. The first processing is the processing that maintains the gain setting value of the first gain setting part as the initial value $G1i+N$ and sets the gain setting value of the second gain setting part as $Vo/Vi/(initial\ value\ G1i+N)$. The second processing is the processing that updates N by adding 1 and executes the first processing again. The third processing is the processing that maintains the gain setting value of the first gain setting part as $1/(initial\ value\ G1i+N)$ and sets the gain setting value of the second gain setting part as $Vo/Vi/(G1i+N)$. The fourth processing is the processing that updates N by adding 1 and executes the third processing again.

In addition, the present invention is preferable to be constituted as mentioned below. That is, in the second processing and fourth processing, an upper limit of N is set in advance and it is compared and judged whether or not N is equal to or more than the upper limit value and, when judged that N is equal to or more than the upper limit value, adding processing for adding 1 to N is not performed.

The gain setting method of the present invention is preferable to be used for setting the gain of the readout signals from the optical disk.

Further, in an optical disk reproducing method that comprises steps of: irradiating a laser to an optical disk by a readout device; driving the readout device reciprocally along a tracking direction; measuring an amplitude of a focus error signal that is generated based on an electric signal obtained by performing photoelectric conversion to reflected light of the optical disk read out by the readout device; and setting a gain in a gain setting part in an amplifier of the focus error signal by using the amplitude of the focus error signal as an output level of the amplifier of the focus error signal, the step of setting the gain in the amplifier of the focus error signal is executed by the gain setting method of the present invention.

In that case, it is preferable to comprise steps of: provisionally setting the gain of the focus error signal that has been set as a gain of a tracking error signal; rotating the optical disk; driving the readout device reciprocally along a tracking direction; measuring an amplitude of a tracking error signal that is generated based on an electric signal obtained by performing photoelectric conversion to reflected light of the optical disk read out by the readout device; and setting a gain in a gain setting part of an amplifier of the tracking error signal by using the amplitude of the tracking error signal as an output level of the amplifier of the tracking error signal, and it is preferable to execute the step of setting the gain in the amplifier of the tracking error signal by the gain setting method of the present invention.

In that case, in the optical disk reproducing method that comprises steps of: provisionally setting the gain of the focus error signal that has been set as a gain of an RF signal; rotating the optical disk; measuring an amplitude of an RF error signal that is generated based on an electric signal obtained by performing photoelectric conversion to reflected light of the optical disk read out by the readout device; and setting a gain in a gain setting part by using an amplitude of the RF error signal as an output level of the amplifier of the RF error signal, it is preferable to execute the step of setting the gain in the amplifier of the RF error signal by the gain setting method of the present invention.

In that case, in the optical disk reproducing method that comprises steps of, rotating the optical disk after setting a gain of a focus error signal; driving a readout device reciprocally along a tracking direction; measuring an amplitude of a tracking error signal that is generated based on an electric signal obtained by performing photoelectric conversion to reflected light of the optical disk read out by the readout device; and setting a gain in a gain setting part of an amplifier of the tracking error signal by using the amplitude of the tracking error signal as an output level of the amplifier of the tracking error signal, it is preferable to execute the step of setting the gain in the amplifier of the tracking error signal by the gain setting method of the present invention.

In that case, it is preferable to perform the gain setting at the time of automatic control performed before starting the disk reproduction.

In the present invention, a signal processing circuit for reading out the information recorded on the optical disk is constituted as described below. That is, the present invention comprises an amplifier for amplifying the electric signal and a controller for controlling the amplifier. The amplifier has a first gain setting part for performing gain setting of an integer multiplication for 1 time (×1) or more, and 1/integer multiplication for less than 1 time (×1), and a second gain setting part for performing a decimal multiplication from 0.5-2 times. The controller compares a measurement result of an output level in the amplifier and a preset target level, and calculates a gain setting value of the second gain setting part based on a result of the comparison.

In that case, it is preferable for the controller to: output a value of the target level/the measured value as a first comparison result; when the first comparison result is smaller than ½ times or larger than 2 times, calculate a gain setting value of the first gain setting part; further output a result of comparison between the first comparison result and the gain setting value of the first gain setting part as a second comparison result; and calculate a gain setting value of the second gain setting part based on a result of comparison between the second comparison result and the gain setting value of the first gain setting part.

In that case, it is preferable for the controller to: prepare a focus error signal based on an electric signal that is obtained by performing photoelectric conversion to reflected light of an optical disk that is read out when a readout device irradiates a laser on the optical disk while the readout device is reciprocally moving along a tracking direction, and measure an amplitude of the focus error signal; and calculate gains of the first and second gain setting parts by using the measured amplitude as a focus error signal output level of the amplifier.

In that case, it is preferable for the controller to: provisionally set the set gain of the focus error signal as a gain of a tracking error signal; rotate the optical disk and drive the readout device reciprocally along a tracking direction; prepare the tracking error signal based on an electric signal obtained by performing photoelectric conversion to reflected light of the optical disk that is read out by the readout device in this state, and measure an amplitude of the tracking error signal; and calculate gains of the first and second gain setting parts by using the measured amplitude as a tracking error signal output level of the amplifier.

In that case, it is preferable for the controller to: provisionally set the set gain of the focus error signal as a gain of an RF signal; measure an amplitude of an RF error signal that is generated based on an electric signal obtained by performing photoelectric conversion on reflected light of the optical disk that is read out by the readout device while the optical disk is rotated; and calculate gains of the first and second gain setting parts by using the measured amplitude of the RF error signal as an RF error signal output level of the amplifier.

In that case, it is preferable for the controller to: measure an amplitude of the tracking error signal while rotating the optical disk and driving the readout device reciprocally along a tracking direction after setting the gain of the focus error signal; set the gain in the first gain setting part for the tracking error signal based on a result of comparison between the measured amplitude and a target value thereof; and calculate gain setting values of the first and second gain setting parts based on an output level of the amplifier in this state.

It is preferable that the optical disk reproducing apparatus is constituted to be provided with: the signal processing circuit of the present invention; a readout device which reads out information form an optical disk and outputs an electric signal on which the information is superimposed; an amplifier that comprises a first gain setting part for performing gain setting of an integer multiplication for 1 time (×1) or more, and 1/integer multiplication for less than 1 time (×1), and a second gain setting part for performing a decimal multiplication from 0.5-2 times; and an operation device for performing servo operation.

In the optical disk reproducing apparatus mounted the gain setting method or the optical disk reproducing method according to the present invention, the output level of the error signals to the servo digital filter can be maintained almost constant, even when there are dispersions in the mechanism thereof or in the reflected light from the disk. Therefore, it is possible to stabilize the servo operation without depending on such different conditions.

Further, the input range of the A/D converter can be utilized to the largest possible extent by inputting to the A/D converter, after the gain setting of the integer-multiple level is performed in the first gain setting part that performs the gain setting in a state of the analog signal. According to this, the servo operation can be stabilized while This securing the accuracy of the gain setting in the second gain setting part (digital).

Furthermore, among the two-stage gain controls that have conventionally been performed for setting the gains, the first gain control for determining the injecting signal can be omitted. Therefore, it is possible to reduce the ROM area for servo operation in the microcomputer and the like.

In the optical disk reproducing apparatus which employs the gain setting method or the optical disk reproducing method according to the present invention, the output level of the error signals to the servo digital filter can be maintained almost constant, even when there are dispersions in the mechanism thereof or in the reflected light from the disk. Therefore, it is effective for stabilizing the servo operation without depending on such dispersions, and improving the capacity of reproduction in the optical disk reproducing apparatus. Moreover, among the two-stage gain controls that have conventionally been performed for setting the gains, the first gain control for determining the injecting signal can be omitted. Therefore, it is effective for reducing the ROM area for servo operation in the microcomputer and the like.

BRIEF DESCRIPTION OF THE DRAWINGS

Other objects of the present invention will become clear from the following description of the preferred embodiments and the appended claims. Those skilled in the art will appreciate that there are many other advantages of the present invention possible by embodying the present invention.

DETAILED DESCRIPTION OF THE INVENTION

Figure 5:
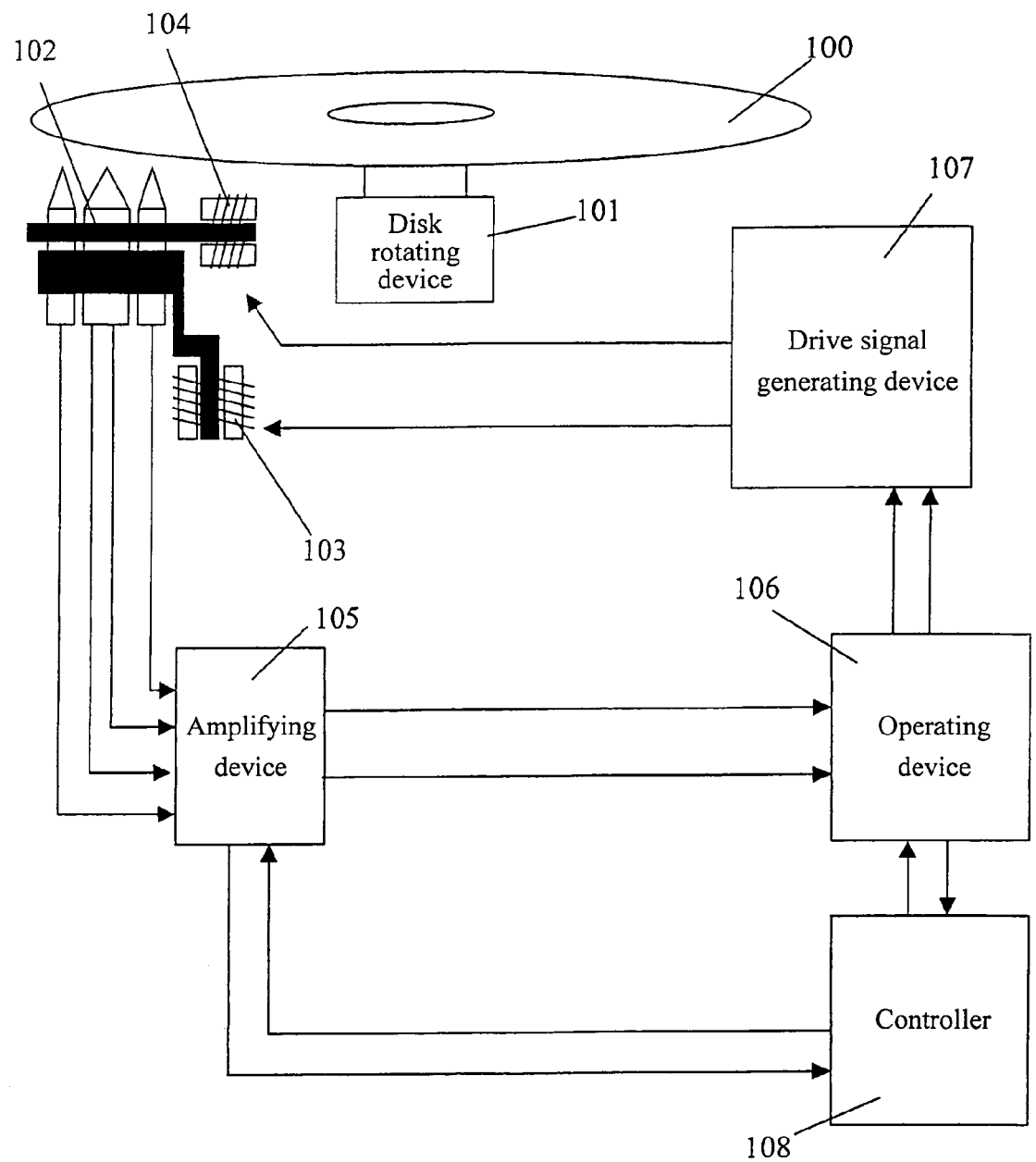
FIG. 5 is a block diagram of the disk reproducing apparatus.

A preferred embodiment of a gain setting method for a disk reproducing apparatus according to the present invention will be described in detail referring to the accompanying drawings. FIG. 5 is an example of a block diagram showing the disk reproducing apparatus. In FIG. 5, reference numeral 100 is an optical disk, 101 is a disk rotating device for rotating a disk, 102 is a pickup that is provided with a laser emission part for irradiating a laser to the disk and a light-receiving element for converting the reflected light from the disk into an electric signal, 103 is a focus actuator for driving the pickup up and down vertically in the tracking direction by drive signals, 104 is a tracking actuator for driving the pickup in the tracking direction by the drive signals, 105 is an amplifier which fetches servo error signals of the focus error signal and the tracking error signal, and focus-type signal from the signals outputted from the pickup, and adds those signals to prepare an RF signal, 106 is an operation device for performing servo operation from the error signals, 107 is a drive signal generator which outputs the drive signal to the actuator according to an instruction from the operation device, and 108 is a controller for controlling the amplifier and a difference signal generator. In this structure, the operation device measures the amplitudes of the error signals and the like and informs the result to the controller. The gains are set through a program operated in the controller.

Figure 6:
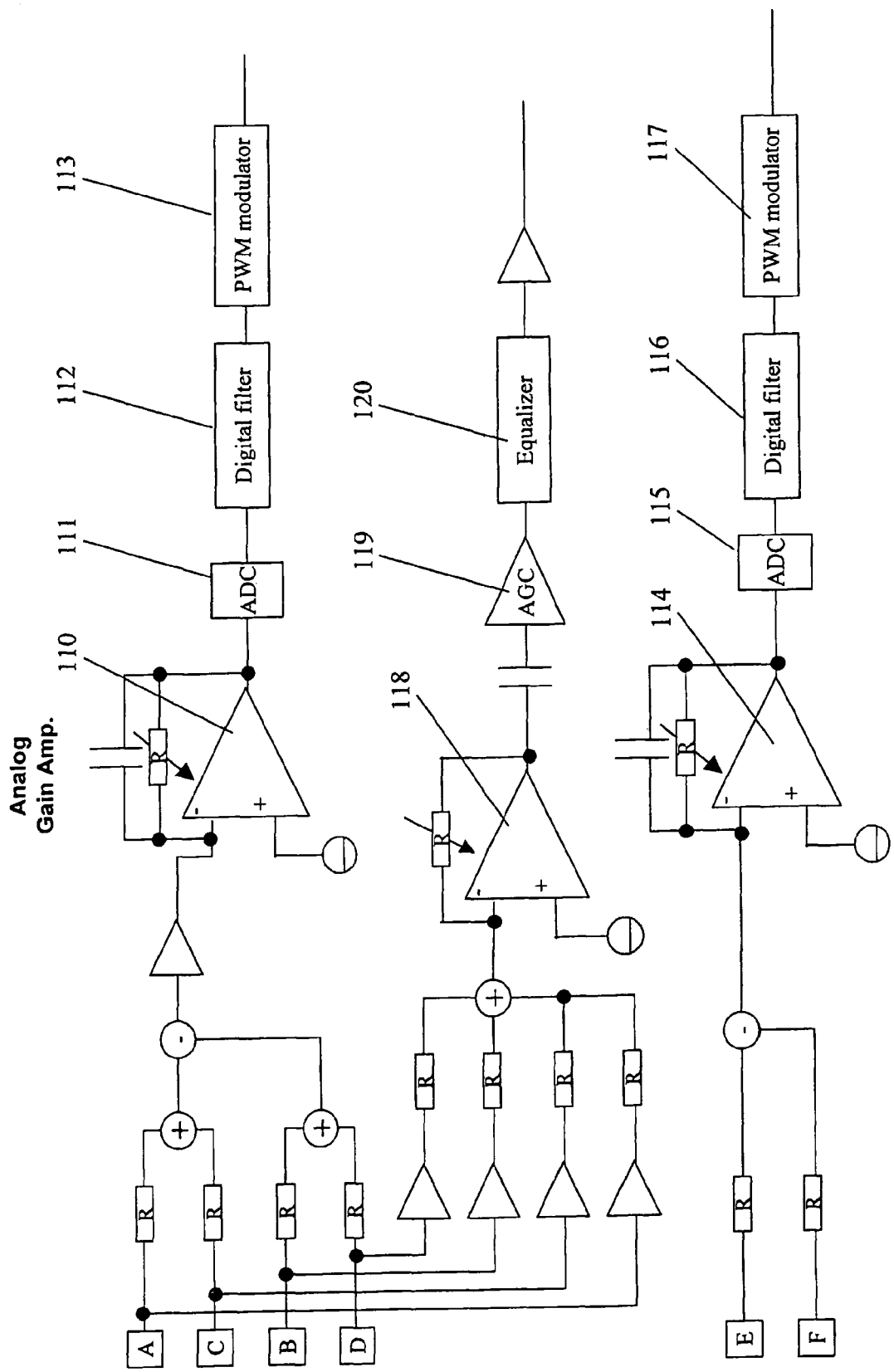
FIG. 6 is a block diagram showing a gain control part of the disk reproducing apparatus.
Figure 7:
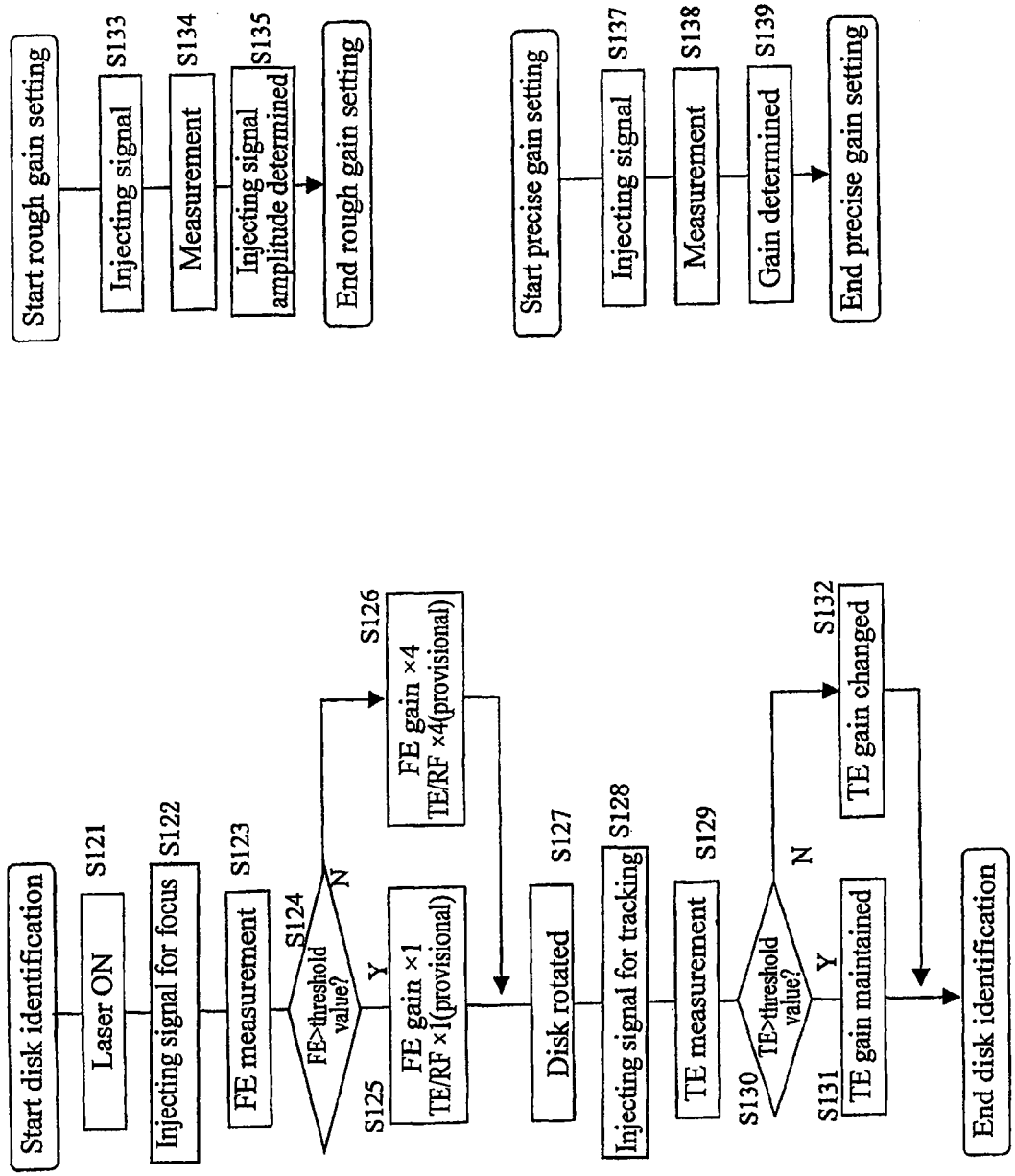
FIG. 7 is a flowchart of conventional gain control.

FIG. 6 is a block diagram of the disk reproducing apparatus, which specifically shows the amplifier that controls the amplifying processing and servo processing, and the gain control part of the operation device. In FIG. 6, reference numeral 110 is an amplifier of the focus error signals, 111 is an A/D converter for converting the amplified focus error signal into a digital value, 112 is a digital filter for converting the digital value of the error signal outputted from the A/D converter 111 into a driver control signal, 113 is a PWM modulator for outputting the output of the digital filter through carrier waves, 114 is an amplifier of the tracking error signal, 115 is an A/D converter for converting the amplified tracking error signal into a digital value, 116 is a digital filter for converting the digital value of the error signal outputted from the A/D converter 115 into a driver control signal, 117 is a PWM modulator for outputting the output of the digital filter through carrier waves, 118 is an amplifier of the RF signal that is amplified after adding the focus-type signals, 119 is an AGC for fixing the output levels of the amplifier to be constant, and 120 is an equalizer for correcting the frequency characteristic of RF signal in the high-frequency area that has a smaller amplitude compared to that of a low-frequency area.

In this structure, the amplitude gains of the focus error signals, the tracking error signals, and the RF signals are determined, respectively, in accordance with the ratio of the input resistance to the feedback resistance of the operational amplifiers that constitute the amplifiers indicated by 110, 114 and 118.

Figure 1:
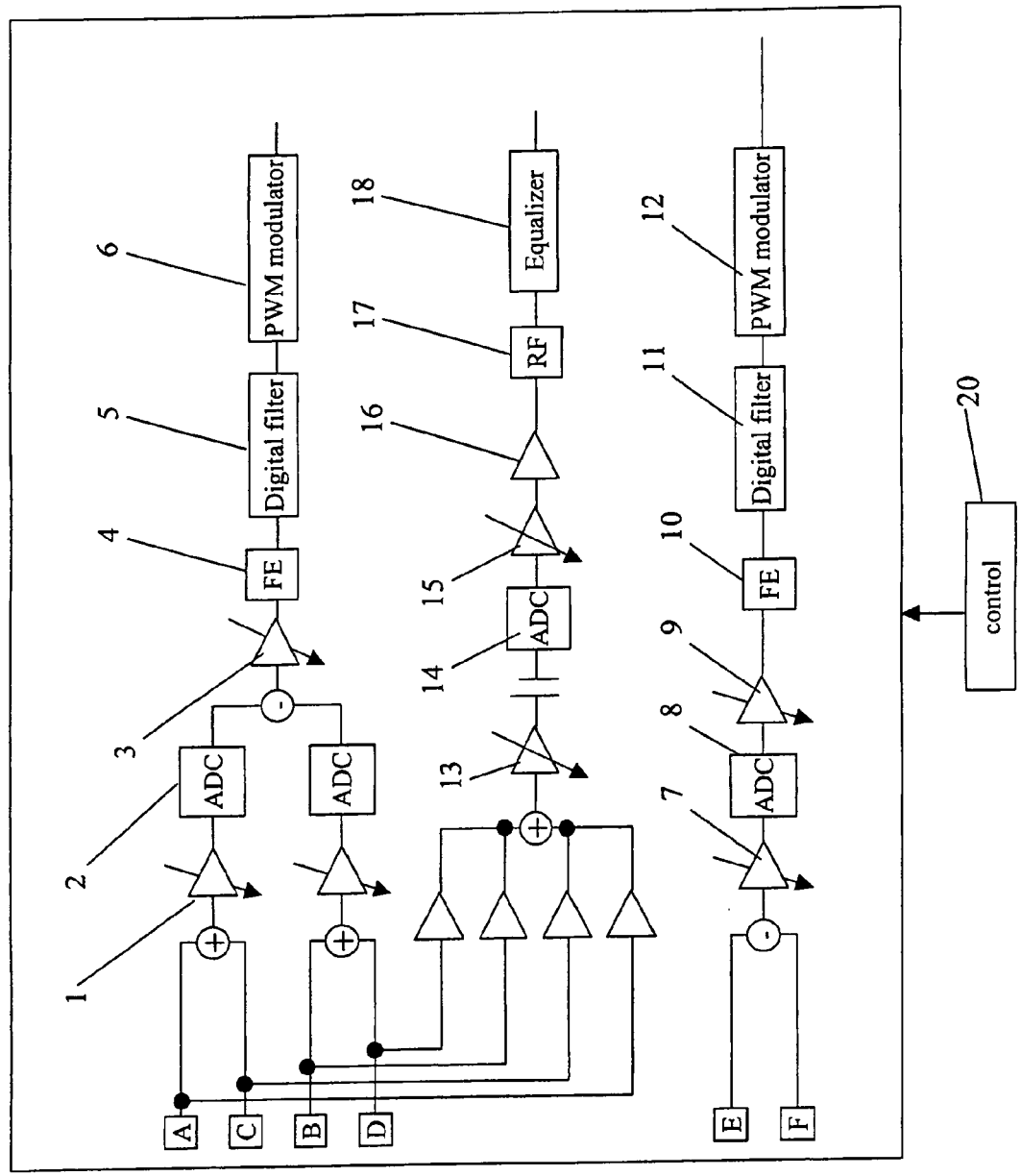
FIG. 1 is a block diagram showing a gain control part of a disk reproducing apparatus according to an embodiment of the present invention.

FIG. 1 is an example of a block diagram of the disk reproducing apparatus according to the embodiment of the present invention, which specifically shows the amplifier that controls the amplifying processing and servo processing, and the gain control part of the operation device. In FIG. 1, reference numeral 1 is a first amplifier which individually amplifies the signals of A+C or B+D among the focus-type signals A, B, C, D in the disk reproducing apparatus, 2 is an A/D converter for converting the amplified signals of A+C and B+D outputted from the first amplifier 1 into the digital value, 3 is a second amplifier which amplifies the focus error signal that is a difference of the output signals from the A/D converter 2, 4 is a focus error measuring device for measuring the amplitude of the output from the second amplifier 3, 5 is a digital filter for converting the digital value of the focus error signal into the driver control signal, 6 is a PWM modulator for outputting the output of the digital filter 5 through the carrier waves, 7 is a first amplifier for amplifying the tracking error signal (a difference between the signals E and F) of the disk reproducing apparatus, 8 is an A/D converter for converting the tracking error signal outputted from the first amplifier 7 into the digital value, 9 is a second amplifier which amplifies the tracking error signal that is a difference of the output signals from the A/D converter 8, 10 is a tracking error measuring device for measuring the amplitude of the output from the second amplifier 9, 11 is a digital filter for converting the digital value of the tracking error signal into the driver control signal, 12 is a PWM modulator for outputting the output of the digital filter 11 through the carrier waves, 13 is a first amplifier which amplifies the RF signal that is the added signal of the focus type signals A+B+C+D, 14 is an A/D converter for converting the RF signal outputted from the first amplifier 13 into the digital value, 15 is a second amplifier for amplifying the RF signal, 16 is an automatic gain controller (AGC) which uniformalizes the amplitudes of the outputs from the second amplifier 15 to absorb the fluctuations of the signals during reproduction, 17 is an RF signal measuring device for measuring the amplitude of the output from the AGC 16, 18 is an equalizer for correcting the frequency characteristic of RF signal in the high-frequency area that has a smaller amplitude compared to that of a low-frequency area, and 20 is a controller for controlling the setting of the gains.

In this embodiment, the amplifiers are constituted in combination with the first amplifiers 1, 7, 13 and the second amplifiers 3, 9, 15 (the first and second amplifiers (1, 3), (7, 9) and (13, 15)). The first gain setting part is constituted with the first amplifiers 1, 7, 13, and the second gain setting part consists of the second amplifiers 3, 9, 15.

In this structure, two amplifiers are provided respectively for the focus error signal type, the tracking error signal type, and the RF signal type. For each of the signal types, the first amplifiers 1, 7, 13 are capable of setting the gains of an integer multiplication for 1 time (×1) or more, and capable of setting the gains of 1/integer multiplication for less than 1 time (×1), whereas the second amplifiers 3, 9, 15 are capable of setting the gains in decimal multiplication from 0.5 to 2 times. In such amplification structure, the gains of the first and second amplifiers (1, 7, 13) and (3, 9, 15) are set such that the amplitudes of the output signals from the second amplifiers 3, 9, 15 can be made constant. The gain setting is controlled with the controller 20. For example, the controller 20 is constituted with software that operates on the servo controller including a gain setting function.

In the embodiment, measuring devices (a focus error measuring device 4, a tracking error measuring device 10, and an RF signal measuring device 17) are provided for measuring the amplitudes of the outputs from the second amplifiers 3, 9, 15. Those measuring devices are provided for making constant the amplitudes of the output signals from the second amplifiers 3, 9, 15. The controller 20 stores the expected values (target) of the outputs (amplitudes) of the measuring devise 4, 10, 17. The controller 20 calculates the ratio of the stored expected values (targets) to the results of the actual measurements at the time controlling, and combines the gain setting of the first and second amplifiers (1, 7, 13), (3, 9, 15) such that the ratio thereof becomes a prescribed value (for example, 1).

Now, an example of a specific arithmetic expression for calculating the gain setting is described. In the description given below, it is assumed that the gain setting values of the first and second amplifiers (1, 7, 13), (3, 9, 15) are Gain1 and Gain2 respectively, the gain initial values thereof are G1$i$ and G2$i$, the expected value (target) of the amplitude of the output signal is Vo, and the amplitude (measurement result) of the input signal is Vi.

For setting the gain, first, the value of the ratio, Vo/Vi, of the expected value (target) Vo to the amplitude (measurement result) Vi is compared and judged. This comparative judgment is referred to as the first comparative judgment hereinafter.

(Processing of the case where it is judged in the first comparative judgment that the ratio (Vo/Vi) satisfies 0.5<=Vo/Vi<=2)

In this case, the gain setting value Gain1 of the first amplifiers 1, 7, 13 is set as the preset initial value G1$i$, and the setting value Gain2 of the second amplifiers 3, 9, 15 is set as the ratio Vo/Vi. This processing is referred to as processing (i).

(Processing of the case where it is judged in the first comparative judgment that the ratio (Vo/Vi) satisfies Vo/Vi>2)

In this case, the gain setting values Gain1 of the first amplifiers 1, 7, 13 is set as (G1$i$+1) that is the value obtained by adding 1 to the initial value G1$i$. This processing is referred to as processing (ii). After performing such gain setting (processing (ii)) on the first amplifiers 1, 7, 13, the value of the ratio (Vo/Vi) is compared for judgment again. This comparative judgment is referred to as the second comparative judgment hereinafter.

When it is judged in the second evaluation that the ratio (Vo/Vi) satisfies Vo/Vi<=2, the setting value Gain1 of the first amplifiers 1, 7, 13 is maintained as (G1$i$+1), while the gain setting value Gain2 of the second amplifiers 3, 9, 15 is set as Vo/Vi/G1$i$. This processing is referred to as processing (iii) hereinafter.

When it is judged in the second evaluation that the ratio (Vo/Vi) does not satisfy Vo/Vi<=2 (Vo/Vi>2), the value (G1$i$+1) in each of the expressions is changed to (G1$i$+2). This processing is referred to as processing (iv) hereinafter. After performing the gain setting (processing (iv)), the second comparative judgment and the gain calculating processing concurrent to the comparative judgment (the processing (ii)-processing (iv)) are executed again. In each of the expressions, the value added to the initial value G1$i$ by moving up and down from 1 in order as in (1→2→ - - -) is referred to as variable N hereinafter.

By doing so, after calculating the value of the variable N with which the ratio (Vo/Vi) satisfies 0.5<=Vo/Vi<=2, the gain setting values Gain1 and Gain2 of the first and second amplifiers (1, 7, 13) and (3, 9, 15) are determined.

(Processing of the case where it is compared for judgment in the first evaluation that the ratio (Vo/Vi) satisfies Vo/Vi<0.5)

In this case, the gain setting value Gain1 of the first amplifiers 1, 7, 13 is set as [1/(G1$i$+1)] that is a reciprocal of the value obtained by adding 1 to the initial value G1$i$. This processing is referred to as processing (v). After performing such gain setting (processing (v)) on the first amplifiers (1, 7, 13), the value of the ratio (Vo/Vi) is compared for judgment again. This comparative judgment is referred to as the third comparative judgment hereinafter.

When it is judged in the third evaluation that the ratio (Vo/Vi) satisfies Vo/Vi>=0.5, the setting value Gain1 of the first amplifiers 1, 7, 13 is maintained as 1/(G1$i$+1), while the gain setting value Gain2 of the second amplifiers 3, 9, 15 is set as Vo/Vi*Gain1. This processing is referred to as processing (vi) hereinafter.

When it is judged in the third evaluation that the ratio (Vo/Vi) does not satisfy Vo/Vi>=0.5 (Vo/Vi<0.5), the value (G1$i$+1) in each of the expressions mentioned above is changed to (G1$i$+2). This processing is referred to as processing (vi) hereinafter. After performing the processing (vii), the third comparative judgment and the gain calculating processing concurrent to comparative judgment (processing (v)-processing (vii)) are executed again. In each of the expressions, the value added to the initial value G1$i$ by moving up and down from 1 in order as in (1→2→ - - -) is referred to as variable N hereinafter as it has been described previously.

According to this, after calculating the value of the variable N with which the ratio (Vo/Vi) satisfies 0.5<=Vo/Vi<=2, the gain setting values Gain1 and Gain2 of the first and second amplifiers (1, 7, 13), (3, 9, 15) are determined.

The embodiment does not employ the two-stage switching of the gains by an integer-multiple unit that has been performed conventionally, but performs setting of the gains by precisely combining the setting values of the gains of the first and second amplifiers (1, 7, 13) and (3, 9, 15). By doing so, very small output dispersions in the structure regarding the gain setting can be corrected with high precision.

For the disk reproducing apparatuses in general, there is almost no change in the initial conditions of the gains in the first and second amplifiers except for secular variation, unless there is exchange of the readout device for repairing and there is insertion/removal of the disk. Thus, the gain setting in the optical disk reproducing apparatus is controlled with focusing on secular variation.

Regarding the optical disk reproducing apparatus, it is very rare that the power of the apparatus is continuously kept ON over such a long period during which secular variation may be generated. Normally, the power is set OFF sometimes during the period where secular variation may be generated. Considering this, generally, the gain setting of the optical disk reproducing apparatus is performed only when the power is ON and at the time of initial operation when exchanging the disk.

It is the same in the embodiment of the present invention, in which the flow of gain setting is executed when the power is ON and in the initial operation when the disks are exchanged, but hardly executed during the reproduction of the disk.

Further, the input range of the A/D converter 2 can be utilized to the largest possible extent through inputting, to the A/D converter 2, the signal to which the gain setting of the integer-multiple level is performed in the first gain setting part (the first amplifiers 1, 7, 13) that performs the gain setting on the analog signal. This secures the accuracy of the gain setting in the second gain setting part (the second amplifiers 3, 9, 15) that performs the digital signal processing, and the servo operation can be stabilized.

Figure 2:
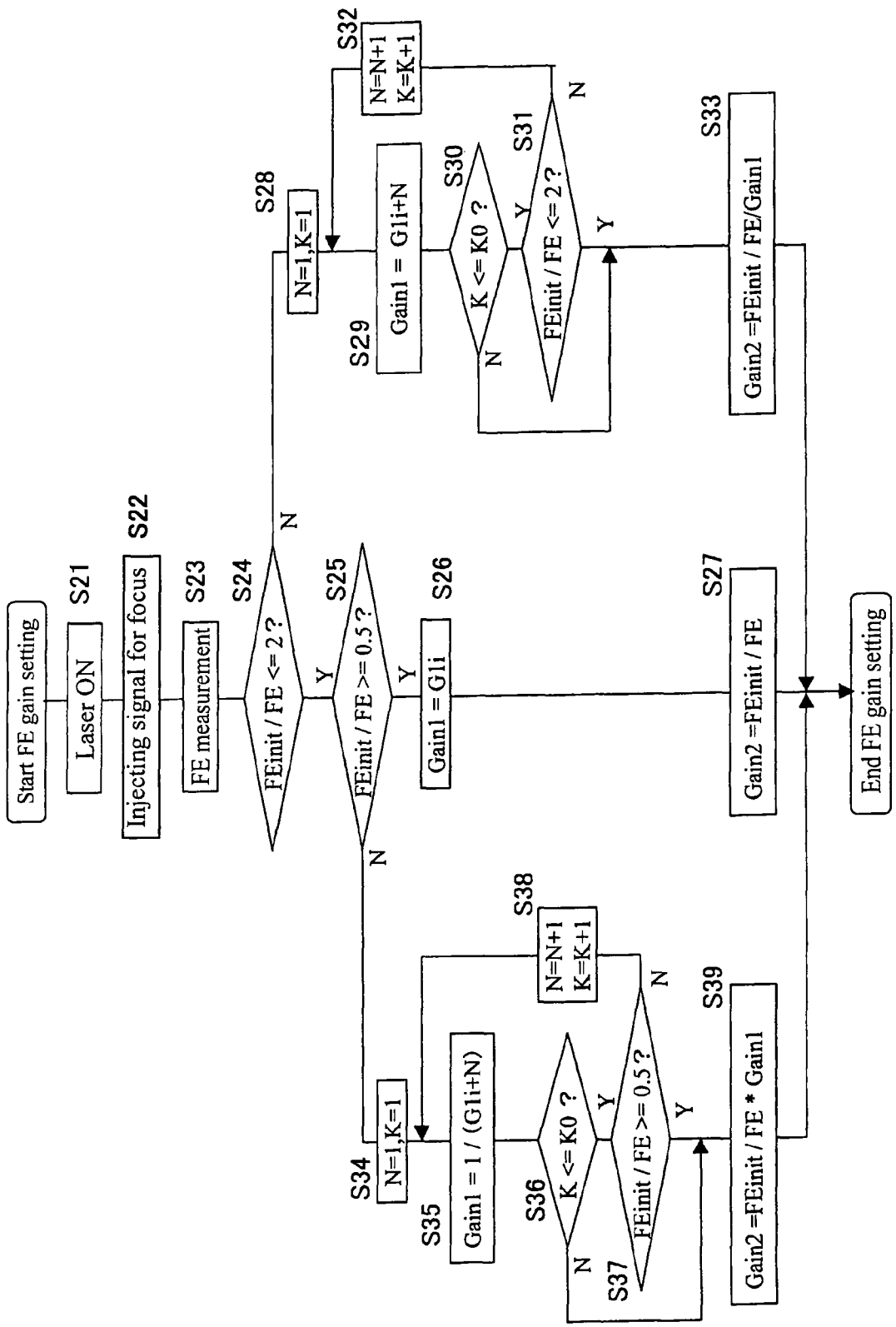
FIG. 2 is flowchart of FE gain control in a first embodiment of the present invention.

FIG. 2 is an overall flowchart of the gain setting method of the focus error signal according to the first embodiment. The gain setting flow according to the embodiment of the present invention will be described referring to FIG. 2. This control is executed with the controller 20. First, action of the laser is started in step 21. In step 22, the focus drive signal is applied, and the readout device is moved reciprocally in the tracking direction, i.e. along the vertical direction with respect to the disk surface. In step 23, the amplitude FE of the focus error signal generated during the reciprocal action is measured. The amplitude FE becomes the data indicating the amplitude (measurement result) Vi of the input signal and the expected value (target) Vo in the expressions described above. That is, the initial value of the amplitude FE to be measured (referred to as amplitude initial value FEinit hereinafter) indicates the expected value (target) Vo, and the measured value of the amplitude FE that is measured in real-time and outputted (referred to as the amplitude measure value FE) indicates the amplitude (measurement result) Vi. Thus, the ratio (FEinit/FE) indicates the ratio (Vo/Vi).

Next, the ratio (FEinit/FE) of the amplitude initial value FEinit of the focus error signal to the amplitude measure value FE of the focus error signal is calculated in step 24. Then, the calculated ratio (FEinit/FE) is compared for judgment whether or not it is 2 or less (FEinit/FE<=2).

When judged in the step 24 that the ratio (FEinit/FE) is 2 or less (FEinit/FE<=2), it is shifted to step 25. Meanwhile, when judged that the ratio is larger than 2 (FEinit/FE>2), it is shifted to step 28.

In the step 25, it is compared for judgment whether or not the ratio (FEinit/FE) is 0.5 or larger (Vo/Vi>=0.5). When judged in the step 25 that the ratio (FEinit/FE) is 0.5 or larger (FEinit/FE>=0.5), it is shifted to step 26. Meanwhile, when judged that the ratio is smaller than 0.5 (FEinit/Fe<0.5), it is shifted to step 34.

The processing in the steps 24 and 25 for performing a comparative judgment on the values of the ratio (FEinit/FE) in this manner corresponds to the first evaluation described above, and the processing thereof corresponds to the first processing of the present invention.

When judged through the processing of the steps 24 and 25 that the ratio (FEinit/FE) is 0.5 or larger and 2 or less (0.5<=FEinit/FE<=2), it is shifted to the processing of steps 26 and 27. The gain Gain1 of the first amplifier 1 is set in the step 26 to the initial value G1i that is set in advance, and it is shifted to the step 27 thereafter. In the step 27, the gain Gain2 of the second amplifier 3 is set to the value of the above-described ratio (FEinit/FE), and a series of the gain setting processing is completed. The processing in the steps 26 and 27 corresponds to the first processing described above.

In the meantime, when judged in the step 24 that the ratio (FEinit/E) is larger than 2 (FEinit/FE>2), it is shifted to the processing of steps 28-33. 1 is substituted to the variable N and K respectively in the step 28, and it is shifted then to the step 29. The variables N, K herein are similar to the variables N, K described above, and these variables N, K constitute a part of an expression used for setting the gains in the steps 29-32 described below.

In the step 29, based on the specified variable N, the value (Gain1=G1i+N), that is obtained by adding the variable N to the preset initial value G1i as the gain setting value of the first amplifier 1, is set. Then, it is shifted to the step 30.

In the step 30, it is compared for judgment whether or not the value of the variable K set in the step 28 is the fixed value (K0) or less, wherein the fixed value (K0) indicates the limit of K. The fixed value (K0) is set in advance as any integers of 2 or larger, and stored in the controller 20. The variable K indicates the upper limit number of times for adding the variable N to the initial value G1i.

When it is compared and judged in the step 30 that the value of the variable K is the fixed value (K0) or less (K<=K0), i.e. the added number of times for the variable N does not exceed the threshold value (K0), it is shifted to the step 31. In the meantime, when compared and judged in the step 30 that the variable K is larger than the fixed value (K0), i.e. the added number of times for the variable N exceeds the threshold value (K0), it is shifted to the step 33 without executing the processing of the step 31. As the initial value of the variable K is 1, it is shifted inevitably to the step 31 in the initial state of the processing.

In the step 31, it is compared and judged again whether or not the ratio (FEinit/FE) is 2 or less (FEinit/FE<=2). When compared and judged in the step 31 that the ratio (FEinit/FE) is not 2 or less (FEinit/FE>2), it is shifted to the step 32. In the step 32, N+1 is substituted to the variable N and K+1 is substituted to K. Then, it is shifted again to the step 29. That is, 1 is added to the values of N and K in the step 32, and it is then returned to the step 29.

It is compared and judged in the step 31 whether or not the ratio (FEinit/FE) is 2 or less (FEinit/FE<=2), while executing the processing of the steps 29-32 repeatedly.

Through repeating the processing of those steps 29-32, the variables N and K that satisfy the conditions of K<=K0, and FEinit/FE<=2 can be specified.

Alternatively, the variables N and K that satisfy the condition of K>K0 can be specified.

When it is confirmed through the processing of the steps 29-32 that the above-described conditions are satisfied, it is shifted to the step 33. The gain setting value Gain2 of the second amplifier 3 is set to FEinit/FE/Gain1 (Gain2=FEinit/FE/Gain1) in the step 33, and thereafter a series of gain setting processing is completed thereby.

The processing of the step 29 corresponds to the above-described processing (ii), the processing of the step 31 to the above-described second evaluation, the processing of the step 33 to the above-described processing (iii), and the processing of the step 32 to the above-described processing (iv) respectively. The processing that is a combination of the processing of the steps 28-31 without loop treatment and the processing of the step 32 corresponds to the first processing of the present invention, while the processing that is a combination of the processing of the steps 28-32 with loop treatment and the processing of the step 33 corresponds to the second processing of the present invention.

In the meantime, when it is compared and judged in the step 25 that the ratio (FEinit/FE) is smaller than 0.5 (FEinit/FE<0.5), it is shifted to the processing of steps 34 -39. 1 is substituted to the variable N and K respectively in the step 34, and it is shifted to the step 35. The variables N, K herein are similar to those of the step 28, and these variables N, K constitute a part of an expression used for setting the gains in the steps 35-38 described below.

In the step 35, based on the specified variable N, the value [(Gain1=1/G1i+N)], that is a reciprocal of the value obtained by adding the variable N to the preset initial value G1i, is set as the gain setting value of the first amplifier 1. Then, it is shifted to the step 36.

In the step 36, it is compared and judged whether or not the value of the variable K set in the step 34 is the fixed value (K0) or less wherein the fixed value (K0) indicates the limit of K. The fixed value (K0) is set in advance as any integers of 2 or larger, and stored in the controller 20. The variable K indicates the upper limit number of times for adding the variable N to the initial value G1i.

When it is compared and judged in the step 36 that the value of the variable K is the fixed value (K0) or less (K<=K0), i.e. the added number of times of the variable N does not exceed the threshold value (K0), it is shifted to the step 37. In the meantime, when compared and judged in the step 36 that the variable K is larger than the fixed value (K0), i.e. the added number of times of the variable N exceeds the threshold value (K0), it is shifted to the step 39 without executing the processing of the step 37. As the initial value of the variable K is 1 here, it is shifted inevitably to the step 37 in the initial state of the processing.

In the step 37, it is compared and judged again whether or not the ratio (FEinit/FE) is 0.5 or larger (FEinit/FE>=0.5). When compared and judged in the step 37 that the ratio (FEinit/FE) is not 0.5 or larger (FEinit/FE<0.5), it is shifted to the step 38. In the step 38, N+1 is substituted to the variable N and K+1 is substituted to K. Then, it is shifted again to the step 35. That is, 1 is added to the values of N and K in the step 32, and it is then returned to the step 35.

It is compared and judged in the step 37 whether or not the ratio (FEinit/FE) is 0.5 or larger (FEinit/FE>=0.5), while executing the processing of the steps 35-38 repeatedly.

Through repeating the processing of those steps 35-38, the variables N and K that satisfy the conditions of K<=K0 and FEinit/FE>=0.5 can be specified.

Alternatively, the variables N and K that satisfy the condition of K>K0 can be specified.

When confirmed through the processing of the steps 35-38 that the above-described conditions are satisfied, it is shifted to the step 39. The gain setting value Gain2 of the second amplifier 3 is set to FEinit/FE*Gain1 (Gain2=FEinit/FE*Gain1) in the step 39, and thereafter a series of gain setting processing is completed.

The processing of the step 35 corresponds to the above-described processing (v), the processing of the step 37 to the above-described third evaluation, the processing of the step 39 to the above-described processing (vi), and the processing of the step 38 to the above-described processing (vii) respectively. Furthermore, the processing that is a combination of the processing of the steps 34-37 without loop treatment and the processing of the step 39 corresponds to the third processing of the present invention, while the processing that is a combination of the processing of the steps 34-38 with loop treatment and the processing of the step 39 corresponds to the fourth processing of the present invention.

Figure 3:
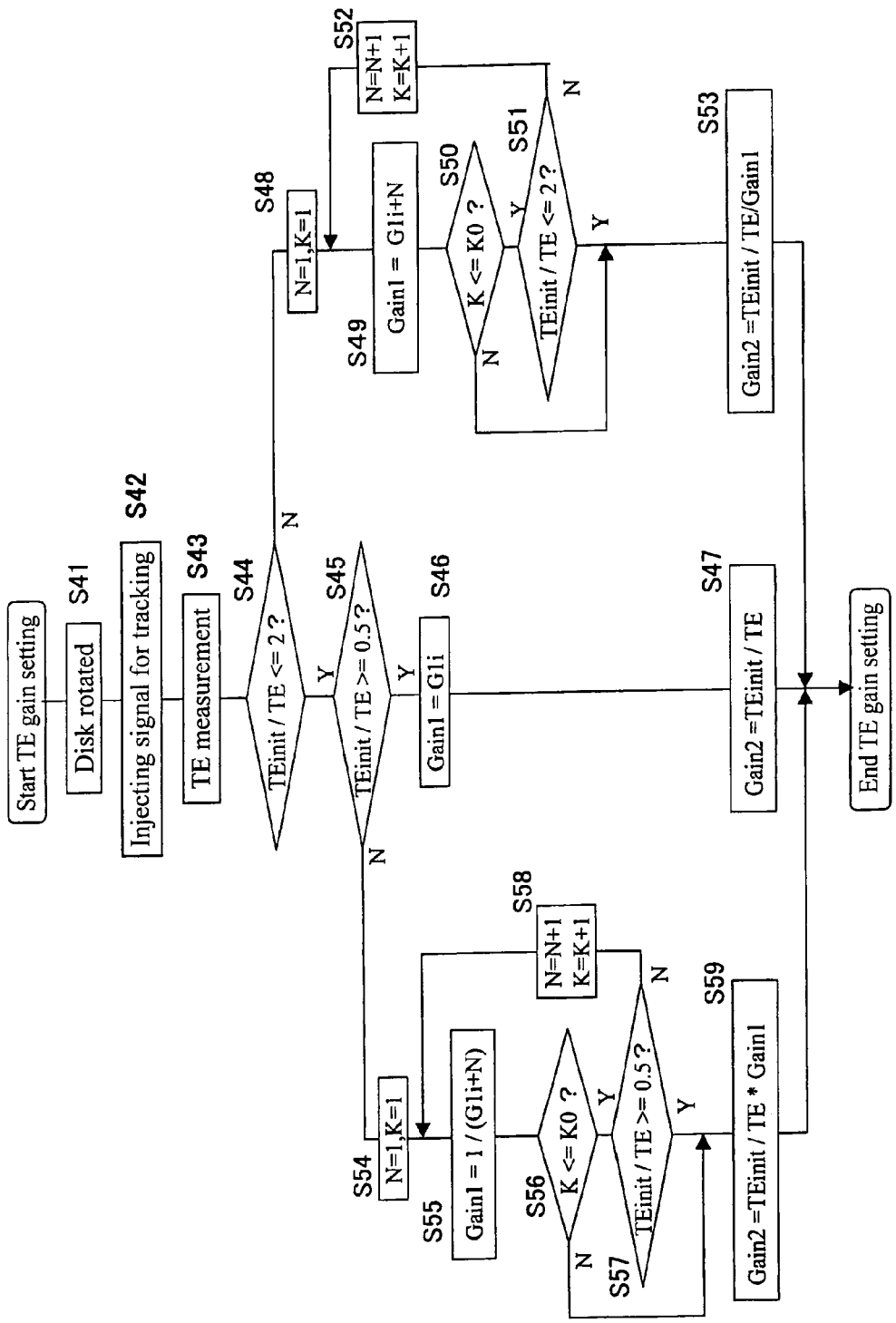
FIG. 3 is flowchart of TE gain control in the first embodiment of the present invention.

FIG. 3 is an overall flowchart of the gain setting method of the tracking error signal according to the first embodiment. The gain setting of the tracking error signal is performed after completing the gain setting of the focus error signal, while rotating the disk. The gain setting processing of the tracking error signal is similar to that of the focus error signal. In the flowchart of FIG. 2, the processing for the tracking error signal is executed instead of the processing for the focus error signal, and a step for rotating the disk (step 42) is executed instead of the step for setting the laser ON (step 22). Other processing is the same as that shown in the flowchart of FIG. 2, so that the descriptions thereof will be omitted.

As shown in FIG. 3, the gain setting of the tracking error signal can be performed irrespective of the gain setting of the focus error signal. However, the gain setting value set for the first amplifier 1 at the time of setting the gain of the focus error signal may be set provisionally as the gain setting value for the tracking error signal, for example. By doing so, a part of or entire gain setting processing of the first amplifier 7 in the tracking error signal shown in FIG. 3 can be omitted, so as to allow for reduction in the number of the processing steps of the controller 20.

Figure 4:
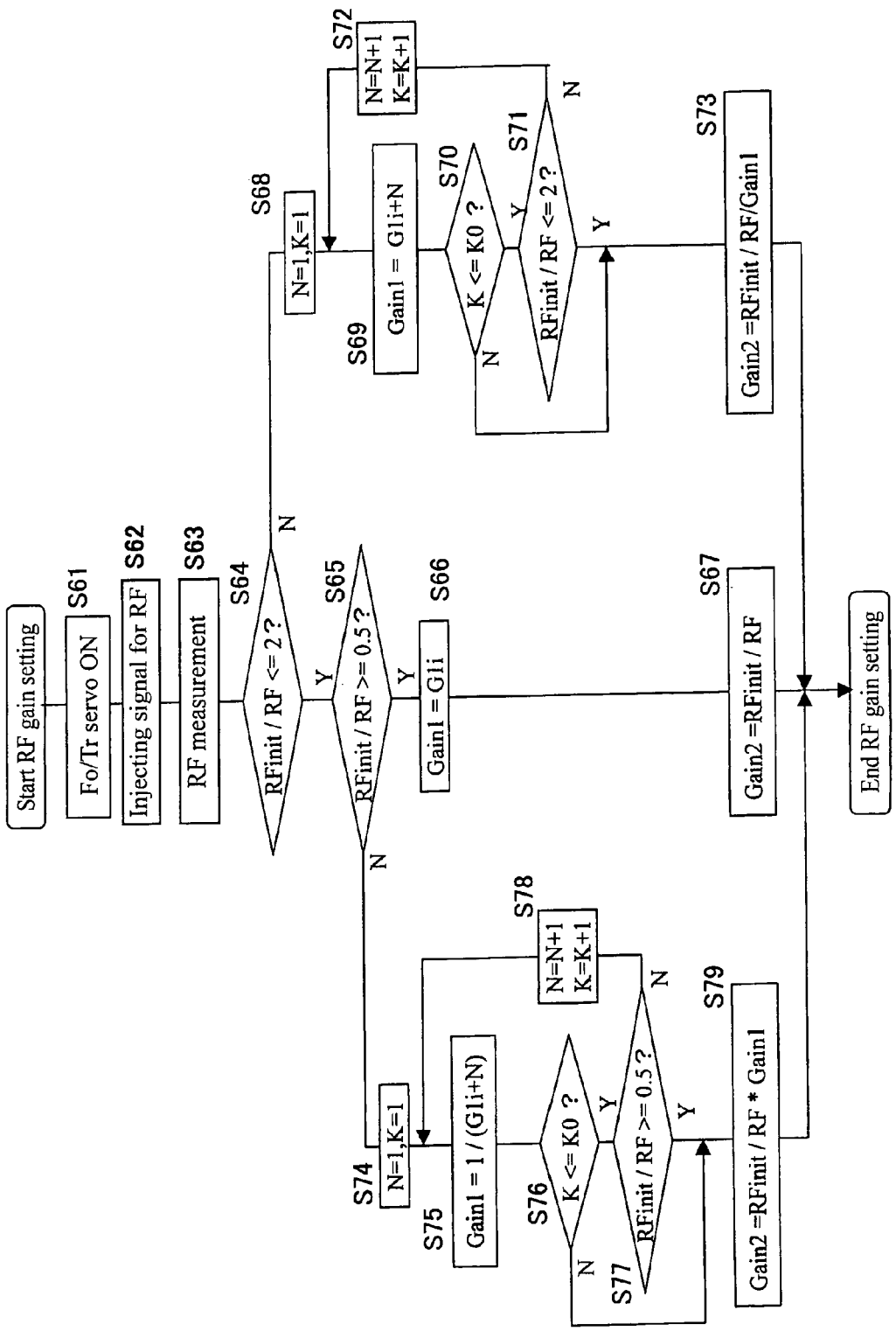
FIG. 4 is flowchart of RF gain control in the first embodiment of the present invention.

FIG. 4 is an overall flowchart of the gain setting method of the RF signal according to the first embodiment. The gain setting of the RF signal is performed after completing the gain setting of the tracking error signal, while setting the focus and tracking servo processing ON. The gain setting processing of the RF signal is similar to that of the focus error signal. In the flowchart of FIG. 2, the processing for the RF signal is executed instead of the processing for the focus error signal, and a step for setting the focus and tracking servos (step 62) ON is executed instead of the step for setting the laser ON (step 22). Other processing is the same as that shown in the flowchart of FIG. 2, so that the descriptions thereof will be omitted.

As shown in FIG. 4, the gain setting of the RF signal can be performed irrespective of the gain setting of the focus error signal and the tracking error signal. However, for example, the gain setting value set for the first amplifier 1 at the time of setting the gain of the focus error signal may be set provisionally as the gain setting value for the RF signal. By doing so, a part of or entire gain setting processing of the first amplifier 13 for the RF signal shown in FIG. 4 can be omitted, so as to allow for reduction in the number of the processing steps of the controller.

The present invention has been described in detail referring to the most preferred embodiments. However, various combinations and modifications of the components are possible without departing from the spirit and the broad scope of the appended claims.

What is claimed is:

1. A gain setting method for setting a gain in an amplifier that amplifies a signal obtained form an optical disk, said method comprising steps of:
    a measuring step for measuring an output level of said amplifier by constituting said amplifier with a first gain setting part for performing gain setting of a multiple of an integer of 2 or larger and gain setting of 1/N times, where N is an integer of 2 or larger, and a second gain setting part for performing gain setting in a range between ½ times and 2 times;
    a comparing step for comparing a measured value that is measured in said measuring step with a preset target level, and outputting a comparison result thereof; and
    a calculating step for calculating gain setting values of said first gain setting part and said second gain setting part based on said comparison result.

2. The gain setting method according to claim 1 for setting said gain in said amplifier that comprises:
    said first gain setting part constituted with an analog gain setting part; said second gain setting part constituted with a digital gain setting part; and an A/D converter that performs A/D conversion to an analog signal whose gain has been set in said first gain setting part, and supplies a converted signal to said second gain setting part.

3. The gain setting method according to claim 1, wherein:
    said comparing step outputs said target level/said measured value as a first comparison result;
    said calculating step further calculates said gain setting value of said first gain setting part, when said first comparison result is smaller than ½ times or larger than 2 times;
    said comparing step further outputs a comparison between said first comparison result and said gain setting value of said first gain setting part as a second comparison result; and said calculating step calculates said gain setting value of said second setting part based on a result of comparison between said second comparison result and said gain setting value of said first gain setting part.

4. The gain setting method according to claim 1, further comprising setting a first gain value, when said measured output level is larger by N times or smaller by 1/N times with respect to said target level, where N is an integer of 2 or larger, wherein said gain setting step sets a gain by multiplying or dividing said first gain value to a value of said target level/said output level after setting said first gain value.

5. The gain setting method according to claim 1, wherein:
said calculating step further calculates said gain setting value of said first gain setting part based on said comparison result;
said measuring step measures amplitudes of an input signal and an output signal of said amplifier respectively;
said comparing step outputs a ratio Vo/Vi of a target value Vo of said amplitude of said output signal to a measured value Vi of said amplitude of said input signal as said comparison result; wherein,
when said ratio Vo/Vi satisfies ½≦Vo/Vi≦2, said calculating step sets said gain setting value of said first gain setting part as a preset initial value G1$i$, and sets said gain setting value of said second gain setting part as Vo/Vi;
when said ratio Vo/Vi satisfies Vo/Vi>2, said calculating step sets said gain setting value of said first gain setting part as G1$i$+N, where N is a variable starting from 1, increased by 1 in order, said comparing step recalculates said ratio Vo/Vi, and said calculating step executes first processing when said recalculated ratio satisfies Vo/Vi≦2, and executes second processing when said recalculated ratio Vo/Vi satisfies Vo/Vi>2 in order to set said gain setting value of said first gain part and said gain setting value of said second gain part, respectively; and
when said ratio Vo/Vi satisfies Vo/Vi<½, said calculating step sets said gain setting value of said first gain setting part as 1/(initial value G1$i$+N) where N is a variable starting from 1, increased by 1 in order, said comparing step recalculates said ratio Vo/Vi, and said calculating step executes third processing performed when said recalculated ratio satisfies Vo/Vi≧½, and executes fourth processing performed when said recalculated ratio Vo/Vi satisfies Vo/Vi<½ in order to set said gain setting value of said first gain part and said gain setting value of said second gain part respectively, wherein:
said first processing is the processing that maintains said gain setting value of said first gain setting part as said initial value G1$i$+N and sets said gain setting value of said second gain setting part as Vo/Vi/(initial value G1$i$+N);
said second processing is the processing that updates said N by adding 1 and executes said first processing again;
said third processing is the processing that maintains said gain setting value of said first gain setting part as 1/(initial value G1$i$+N) and sets said gain setting value of said second gain setting part as Vo/Ni/(G1$i$+N); and
said fourth processing is the processing that updates said N by adding 1 and executes said third processing again.

6. The gain setting method according to claim 5, wherein, an upper limit of said N is set in advance in said second processing and fourth processing and adding processing for adding 1 to said N is not performed when it is compared and judged that said N is equal to or more than said upper limit value after it is compared and judged whether or not said N is equal to or more than said upper limit value.

7. An optical disk reproducing method, comprising:
a step of performing said gain setting method according to claim 1 for setting a gain of a readout signal from an optical disk.

8. An optical disk reproducing method, comprising:
a step for irradiating a laser to an optical disk by a readout device;
a step for driving said readout device reciprocally along a tracking direction;
a step for measuring an amplitude of a focus error signal that is generated based on an electric signal that is obtained by performing photoelectric conversion to reflected light of said optical disk read out by said readout device; and
a step for setting a gain in a gain setting part of an amplifier of said focus error signal by using said amplitude of said focus error signal as an output level of said amplifier of said focus error signal, wherein
said step of setting said gain in said amplifier of said focus error signal is executed by said gain setting method according to claim 1.

9. The optical disk reproducing method according to claim 8, further comprising:
a step for provisionally setting said gain of said set focus error signal as a gain of a tracking error signal;
a step for rotating said optical disk;
a step for driving said readout device reciprocally along a tracking direction;
a step for measuring an amplitude of a tracking error signal that is generated based on an electric signal that is obtained by performing photoelectric conversion to reflected light of said optical disk read out by said readout device; and
a step for setting a gain in a gain setting part of an amplifier of said tracking error signal by using said amplitude of said tracking error signal as an output level of said amplifier of said tracking error signal, wherein
said step of setting said gain in said amplifier of said tracking error signal is executed by said gain setting method according to claim 1.

10. The optical disk reproducing method according to claim 8, further comprising steps of:
a step for provisionally setting said gain of said set focus error signal as a gain of an RF signal;
a step for rotating said optical disk;
a step for measuring an amplitude of an RF error signal that is generated based on an electric signal that is obtained by performing photoelectric conversion to reflected light of said optical disk read out by said readout device; and
a step for setting a gain in a gain setting part of an amplifier of said RF error signal by using said amplitude of said RF error signal as an output level of said amplifier of said RF error signal, wherein
said step of setting said gain in said amplifier of said RF error signal is executed by said gain setting method according to claim 1.

11. The optical disk reproducing method according to claim 7, further comprising, after setting a gain of a focus error signal:
a step for rotating said optical disk;
a step for driving a readout device reciprocally along a tracking direction;
a step for measuring an amplitude of a tracking error signal that is generated based on an electric signal that is obtained by performing photoelectric conversion to reflected light of said optical disk read out by said readout device; and a step for setting a gain in a gain setting part of an amplifier of said tracking error signal by using said amplitude of said tracking error signal as an output level of said amplifier of said tracking error signal, wherein said step of setting said gain in said amplifier of said tracking error signal is executed by said gain setting method according to claim 1.

12. The optical disk reproducing method according to claim 7, wherein gain setting is performed at a time of automatic control performed before starting disk reproduction.

13. The optical disk reproducing method according to claim 8, wherein gain setting is performed at a time of automatic control performed before starting disk reproduction.

14. A signal processing circuit for processing an electric signal that is obtained by reading out information recorded on an optical disk, said signal processing circuit comprising an amplifier for amplifying said electric signal and a controller for controlling said amplifier, wherein:

said amplifier comprises a first gain setting part for performing gain setting of an integer multiplication for 1 time (×1) or more, and 1/integer multiplication for less than 1 time (×1), and a second gain setting part for performing a decimal multiplication in a range between 0.5 times and 2 times; and said controller performs a comparison of a measurement result of an output level of said amplifier and a preset target level, and calculates a gain setting value of said second gain setting part based on a result of said comparison.

15. The signal processing circuit according to claim 14, wherein said controller:

outputs a value of said target level/said measured value as a first comparison result;

calculates a gain setting value of said first gain setting part when said first comparison result is smaller than ½ times or larger than 2 times;

further outputs a result of comparison between said first comparison result and said gain setting value of said first gain setting part as a second comparison result; and calculates a gain setting value of said second gain setting part based on a result of comparison between said second comparison result and said gain setting value of said first gain setting part.

16. The signal processing circuit according to claim 14, wherein said controller:

generates a focus error signal based on an electric signal that is obtained by performing photoelectric conversion to reflected light of an optical disk that is read out when a readout device irradiates a laser on said optical disk while said readout device is reciprocally moving along a tracking direction, and measures an amplitude of said focus error signal; and calculates gains of said first and second gain setting parts by using said measured amplitude as a focus error signal output level of said amplifier.

17. The signal processing circuit according to claim 16, wherein said controller:

provisionally sets said set gain of said focus error signal as a gain of a tracking error signal;

rotates said optical disk and drives said readout device reciprocally along a tracking direction;

generates said tracking error signal based on an electric signal that is obtained by performing photoelectric conversion to reflected light of said optical disk that is read out by said readout device in this state, and measures an amplitude of said tracking error signal; and calculates gains of said first and second gain setting parts by using said measured amplitude as a tracking error signal output level of said amplifier.

18. The signal processing circuit according to claim 16, wherein said controller:

provisionally sets said set gain of said focus error signal as a gain of an RF signal;

rotates said optical disk and drives said readout device reciprocally along a tracking direction;

measures an amplitude of an RF error signal that is generated based on an electric signal that is obtained by performing photoelectric conversion to reflected light of said optical disk that is read out by said readout device while said optical disk is rotated; and calculates gains of said first and second gain setting parts by using said measured amplitude of said RF error signal as an RF error signal output level of said amplifier.

19. The signal processing circuit according to claim 16, wherein said controller, after setting said gain of said focus error signal:

measures an amplitude of said tracking error signal while rotating said optical disk and driving said readout device reciprocally along a tracking direction;

sets said gain in said first gain setting part for said tracking error signal based on a result of comparison between said measured amplitude and a target value thereof; and calculates gain setting values of said first and second gain setting parts based on an output level of said amplifier in this state.

20. An optical disk reproducing apparatus, comprising:

said signal processing circuit according to claim 14;

a readout device which reads out information form an optical disk and outputs an electric signal on which said information is superimposed;

an amplifier comprising a first gain setting part for performing gain setting of an integer multiplication for 1 time (×1) or more, and 1/integer multiplication for less than 1 time (×1), and a second gain setting part for performing a decimal multiplication in a range between 0.5 times and 2 times; and an operation device for performing servo operation.

* * * * *